(12) United States Patent
Ruppin (10) Patent No.: US 9,132,905 B2
(45) Date of Patent: Sep. 15, 2015

(54) CARRIER ARM ARRANGEMENT, DOOR AND TRANSPORT MEANS

(75) Inventor: Thorsten Ruppin, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 284 days.

(21) Appl. No.: 13/561,167

(22) Filed: Jul. 30, 2012

(65) Prior Publication Data

US 2013/0043349 A1 Feb. 21, 2013

Related U.S. Application Data

(60) Provisional application No. 61/515,654, filed on Aug. 5, 2011.

(30) Foreign Application Priority Data

Aug. 5, 2011 (DE) .......................... 10 2011 109 652

(51) Int. Cl.
*B64C 1/14* (2006.01)

(52) U.S. Cl.
CPC .............. *B64C 1/1407* (2013.01); *Y10T 16/522* (2015.01)

(58) Field of Classification Search
CPC ...................................................... E05D 11/06
USPC .............. 244/129.5, 905, 129.4; 16/223, 374, 16/375
See application file for complete search history.

(56) References Cited

U.S. PATENT DOCUMENTS

| | | | | |
|---|---|---|---|---|
| 3,791,073 A | * | 2/1974 | Baker | 49/249 |
| 4,199,120 A | * | 4/1980 | Bergman et al. | 244/129.5 |
| 4,552,326 A | * | 11/1985 | Bokalot | 244/129.5 |
| 4,715,562 A | * | 12/1987 | Bokalot | 244/137.2 |
| 5,156,359 A | * | 10/1992 | Noble et al. | 244/129.4 |
| 6,547,186 B2 | * | 4/2003 | Senger | 244/129.5 |
| 2010/0276543 A1 | | 11/2010 | Schimmler et al. | |
| 2011/0049299 A1 | * | 3/2011 | Gowing et al. | 244/129.5 |
| 2013/0068890 A1 | * | 3/2013 | Boren | 244/137.2 |

FOREIGN PATENT DOCUMENTS

DE 102008030696 A1 1/2010

OTHER PUBLICATIONS

German Patent and Trade Mark Office, Office Action for German Patent Application No. 10 2011 109 652.7, mailed Jun. 10, 2013.

* cited by examiner

*Primary Examiner* — Christopher P Ellis
*Assistant Examiner* — Jessica Wong
(74) *Attorney, Agent, or Firm* — Ingrassia Fisher & Lorenz, P.C.

(57) ABSTRACT

The present disclosure relates to a door for a transport means, which structurally provides the largest possible door width. Using a movable carrier arm device, the width of the door aperture can be reduced with little complexity from about 42 inches (Type "A") as an additional equipment option to about 34 inches (Type "C"). To this end, the movable, for example, foldable, carrier arm device is provided which, when the door opens, automatically moves from a retracted position to an extended position in order to reduce the door aperture width to a value which has been predetermined for evacuation. Afterwards, the extended carrier arm device can be folded in again. In this manner, it may be possible to increase the comfort for the passengers and the crew when the aircraft is in the normal operating state since the carrier arm device provides a greater aperture width in the retracted position.

16 Claims, 6 Drawing Sheets

CARRIER ARM ARRANGEMENT, DOOR AND TRANSPORT MEANS

CROSS-REFERENCE TO RELATED APPLICATIONS

This application claims priority to German Patent Application No. 10 2011 109 652.7, filed Aug. 5, 2011 and to U.S. Provisional Patent Application No. 61/515,654, filed Aug. 5, 2011, which are incorporated herein by reference in their entirety.

TECHNICAL FIELD

The technical field relates to the external doors of transport means. In particular, the present disclosure relates to a carrier arm arrangement for a door of a transport means, a door having a carrier arm arrangement and a transport means having a door.

BACKGROUND

Doors of transport means may be connected to the carrying structure of the transport means by means of appropriate hinges or carrier arms (also called hinge arms). In the case of external doors of aircraft, the door may be connected to the carrying structure or the door frame of the cabin by means of a single carrier arm arrangement.

In the event of evacuation, when a single-track emergency slide is used, it may be specified that the width of the door aperture should not exceed a fixed maximum dimension. This may keep the number of passengers who use the emergency slide per unit of time below a specific value. The related maximum dimension provided for the door aperture width may in this instance be approximately 86 cm (about 34 inches). This is also referred to in this context as a type "C" aperture width.

When a dual-track emergency slide is used, however, the door aperture width may be larger. Depending on the emergency slide to be used, various door aperture widths may accordingly be provided.

DE 10 2009 019 434 A1 and US 2010/0276543 A1 disclose aircraft doors.

In addition, other objects, desirable features and characteristics will become apparent from the subsequent summary and detailed description, and the appended claims, taken in conjunction with the accompanying drawings and this background.

SUMMARY

It may be desirable to have a transport means which enables the flexible use of various emergency slides.

The features described below may be implemented both in the carrier arm arrangement and in the door and the transport means, and vice versa.

According to an embodiment of the present disclosure, a carrier arm arrangement (i.e. hinge arm assembly) for a door of a transport means is specified and has a carrier arm (i.e. hinge arm) for retaining and supporting the door. Furthermore, a movable carrier arm device (i.e. hinge arm device) is provided which is constructed to assume a retracted position and an extended position. The carrier arm device is constructed to reduce a width of a door aperture when the door is opened when the movable carrier arm device is moved from the retracted position to the extended position.

That is to say, the carrier arm arrangement having the carrier arm device, when the door is folded open and when the carrier arm device is in a retracted position, protrudes to a lesser extent into the door aperture than when the carrier arm device is in an extended position. It is not necessary to provide structurally different door cutouts dependent on whether a dual-track or a single-track emergency slide is used.

Using the present disclosure, it may consequently be possible to provide a transport means which has door cutouts which are structurally as large as possible. The required aperture width may be adapted with little complexity depending on the configuration requirement.

The movable carrier arm device may be provided in this instance as a retrofittable, modular component which can be retrofitted without having to carry out complex structural modifications to a carrier arm which is already installed.

In this manner, it may be possible to convert the carrier arm arrangement from a configuration which is provided for use with dual-track emergency slide operation to a configuration which is provided for use with single-track emergency slide operation by retrofitting the movable carrier arm device.

In the first instance mentioned of a dual-track emergency slide, the movable carrier arm device is not required. In this instance, the carrier arm may be provided with a standard cover which has no recess for the carrier arm device.

For example, the holes, etc., necessary for the subsequent installation of the movable carrier arm device may already be provided in the carrier arm so that retrofitting may be carried out without significant complexity.

According to an embodiment of the present disclosure, the movable carrier arm arrangement covers the recessed region of the standard cover. As an alternative to this carrier arm cover, a different carrier arm cover without any recess may be provided (for example, in the case of a dual-track emergency slide).

According to another embodiment of the present disclosure, the carrier arm arrangement is constructed to reduce the width of the door aperture, from approximately 100% to approximately 80% by the movable carrier arm device being extended.

That is to say, by extending (for example, folding out) the movable carrier arm device, the effectively usable door aperture width can be significantly reduced, for example, from a type "A" exit (about 41 inches, that is, about 104 cm) to a type "C" exit (about 34 inches, that is, about 86 cm).

According to another embodiment of the present disclosure, the movable carrier arm device is secured to the carrier arm cover. Alternatively or in addition, the movable carrier arm device may also be secured to the carrier arm itself.

According to another embodiment of the present disclosure, the movable carrier arm device is constructed to automatically assume the extended position when the door is opened (if it was previously in the retracted position).

That is to say, the carrier arm device always folds out from the carrier arm when the door is opened. After the door is opened, it can then be moved, for example manually, back into the folded-in, retracted position.

According to another embodiment of the present disclosure, the movable carrier arm device is constructed to only automatically assume the extended position when the door is opened in the event of an emergency which requires the use of an emergency slide.

This may be achieved, for example, by the arming of the emergency slide, which is carried out, for example, before the aircraft takes off, being coupled to the movable carrier arm device or the actuation mechanism thereof, so that the arming of the emergency slide also brings about arming of the actuation mechanism. If the door is then opened without the emergency slide being disarmed beforehand, the carrier arm device automatically folds out so that the door aperture is automatically reduced.

However, if the emergency slide is disarmed before the door is opened, as is the case when the door is opened under normal circumstances, the actuation mechanism of the carrier arm device is disarmed at the same time so that it does not fold out when the door is opened.

That is to say, the carrier arm device only moves from the retracted position to the extended position when the door is opened in the event of an emergency.

For automated or partially automated actuation of the carrier arm device, there may be provided, for example, a corresponding pin mechanism which strikes the door frame when the door is opened and consequently brings about opening of the flap of the carrier arm device. The movement of the carrier arm device from the retracted state into the extended state is therefore actuated by the door approaching the door frame (when the door is opened). Alternatively or in addition to such a pressure pin mechanism, an actuation hook mechanism may also be provided. In this instance, the actuation may be carried out by means of a rotational movement of the hook, whereas this is carried out by means of a linear movement in the case of the pressure pin.

According to another embodiment of the present disclosure, a door for a transport means is specified having a carrier arm arrangement described above and below.

According to another embodiment of the present disclosure, the door and the carrier arm arrangement correspond to each other in such a manner that, owing to a movement of the carrier arm device into the extended position, the width of the door aperture with the door open is reduced from about 104 cm (about 41 inches) to about 86 cm (about 34 inches).

According to another embodiment of the present disclosure, there is set out a transport means is specified having a door which is described above and below. The transport means is, for example, an aircraft, such as a helicopter, airship or aeroplane, a road vehicle such as, for example, an automobile, lorry or bus, a rail vehicle or a watercraft.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
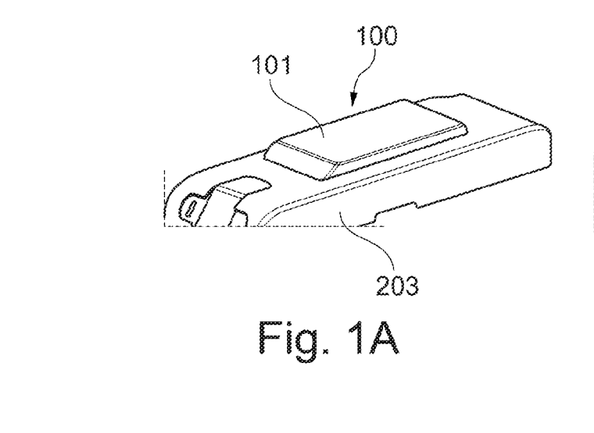
FIGS. 1A to 1F show various states of a carrier arm arrangement according to an embodiment of the present disclosure.
Figure 1B:
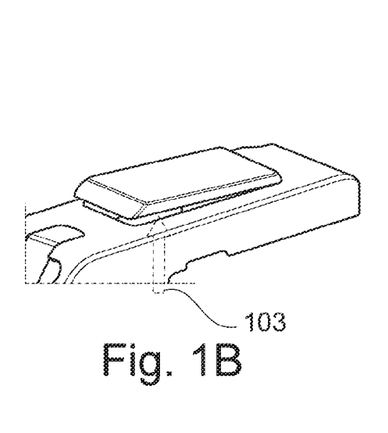

FIGS. 1A to 1F show various states of the movable carrier arm device 100 in combination with a carrier arm cover 203. In FIG. 1A, the movable carrier arm device 100 is in the retracted position so that only the covering flap 101 of the carrier arm device can be seen. In this state, the covering flap 101 may protrude slightly from the surface of the carrier arm cover 203. There may also be provision for the surface of the covering flap 101 of the movable carrier arm device 100 to be arranged substantially in the same plane as the surface of the corresponding region of the carrier arm cover 203, in which region the covering flap 101 is embedded.

The carrier arm cover 203 may be a standard component which has a recess for receiving the movable carrier arm device 100. By applying a compression force to the covering flap 101 from below, that is to say, from inside the carrier arm arrangement (see arrow 103), the opening operation of the carrier arm device can be triggered (see FIG. 1B). This compression force may be brought about, for example, by an actuation pin or an actuation hook, which presses from the inner side against the rear side of the covering flap 101 when the door is opened. The covering flap may also be mechanically pretensioned so that it automatically springs open by a lock being released when the door is opened.

Figure 1C:
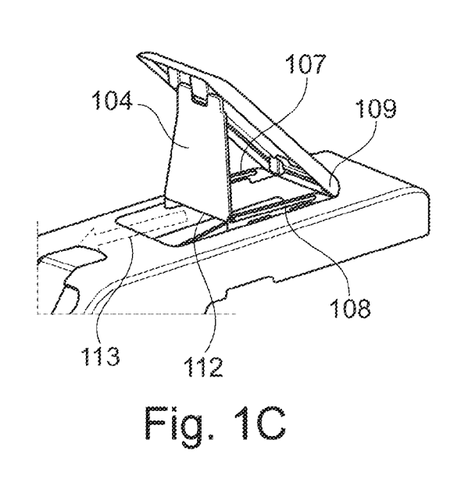

FIG. 1C shows the extended position of the movable carrier arm device. This position is achieved by the lower edge 112 of a plate-like support element 104 being moved in the direction of the arrow 113 along the rails 107, 108. In this instance, the rails 107, 108 extend parallel to the surface of the covering flap 101 in the folded-in state (see FIG. 1A). In the folded-out state, the angle between the two rails 107, 108 and the upper side of the covering flap 101 is, for example, between about 30 and about 60 degrees, for example, approximately 40 degrees. However, the angle may also be up to about 90 degrees or more.

In order to enable the pivot movement of the covering flap 101, this element is rotatably mounted by means of an axial suspension 109. The axial suspension 109 is located in this instance at the side of the covering flap 101 which is, for example, rectangular, which side faces the carrier arm in the folded-open state, whereas the securing of the support element 104 to the flap 101 is at the opposing side.

Figure 5A:
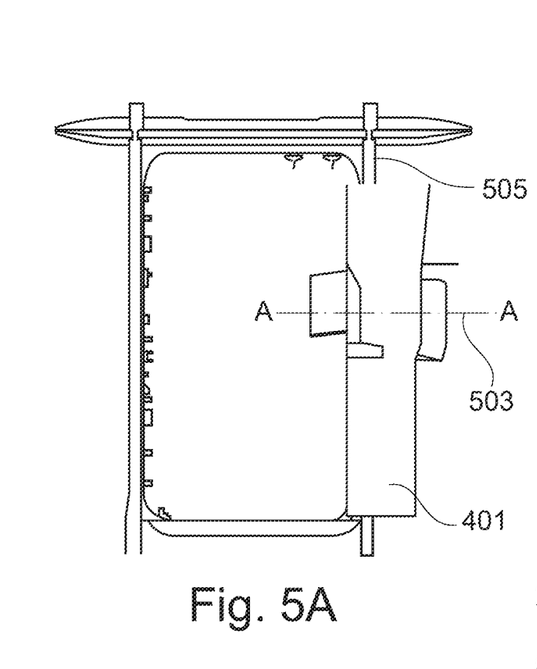
FIG. 5A shows a door frame with a door fitted therein according to an embodiment of the present disclosure.
Figure 5B:
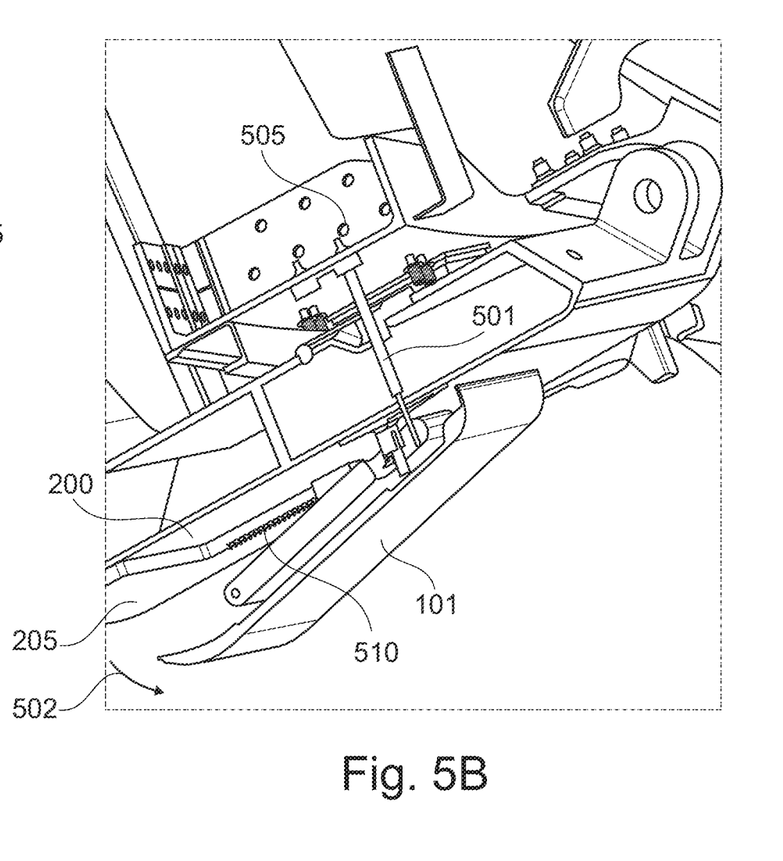
FIG. 5B is a section through the door of FIG. 5A along the line of section A-A.

The opening operation can be supported by means of corresponding resilient elements which extend along the rails 107, 108 (see reference numeral 510 in FIG. 5B). The supporting force begins, for example, after a minimum opening angle is exceeded.

In this manner, it is possible, by applying a minimum compression force to the inner side of the covering flap 101 when the minimum opening angle is exceeded, for automatic additional opening of the covering flap 101 to be carried out so that it moves into the extended position.

Figure 1D:
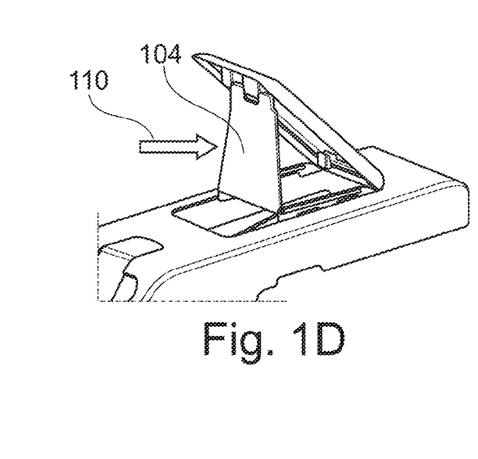
Figure 1E:
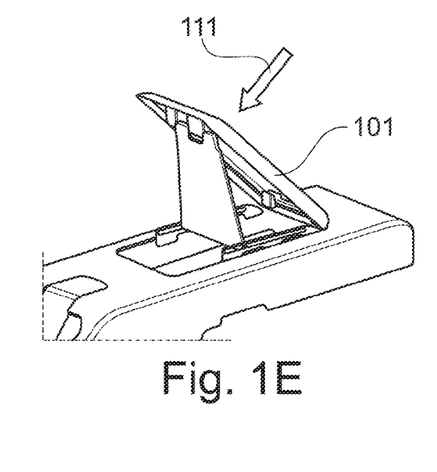
Figure 1F:
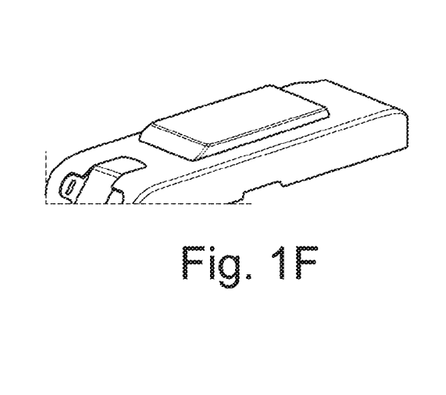

FIGS. 1D to 1F show the reverse operation, in which the movable carrier arm device 100 is moved from the extended position (see FIG. 1D) by applying a compression force to the plate-like support element 104 (see arrow 110) into an intermediate position (see FIG. 1E) and subsequently by applying a compression force to the outer side of the covering flap 101 (see arrow 111 in FIG. 1E) into the retracted position (see FIG. 1F). This operation can be carried out manually by a crew member when the door is opened.

The movement of the carrier arm device from the folded-in position into the folded-out extended position can be actuated, depending on the embodiment, by means of a corresponding mechanism either in a semi-automated manner, that is to say, each time the door is opened, or in a fully automated manner, that is to say, only when the emergency slide has been "armed" beforehand.

In the event of evacuation, the aperture width of the door in an equipment variant with a single-track emergency slide can be limited to the type "C" (about 34 inches, that is to say, approximately 86 cm).

However, during normal operation of this door, the movable carrier arm device allows a door aperture width ("clear passageway") of approximately 104 cm (about 41 inches). In this instance, substantially the entire width of a so-called type "A" exit is accordingly available (with the exception of a projection of the carrier arm device beyond the carrier arm cover). This provides additional comfort for the air passenger when embarking and disembarking. An increase in comfort for the cabin crew can also thereby be achieved since, even when the door is closed, more space is available in the door region during flight operation. Consequently, the catering section can also benefit from the increased door aperture width.

Figure 2:
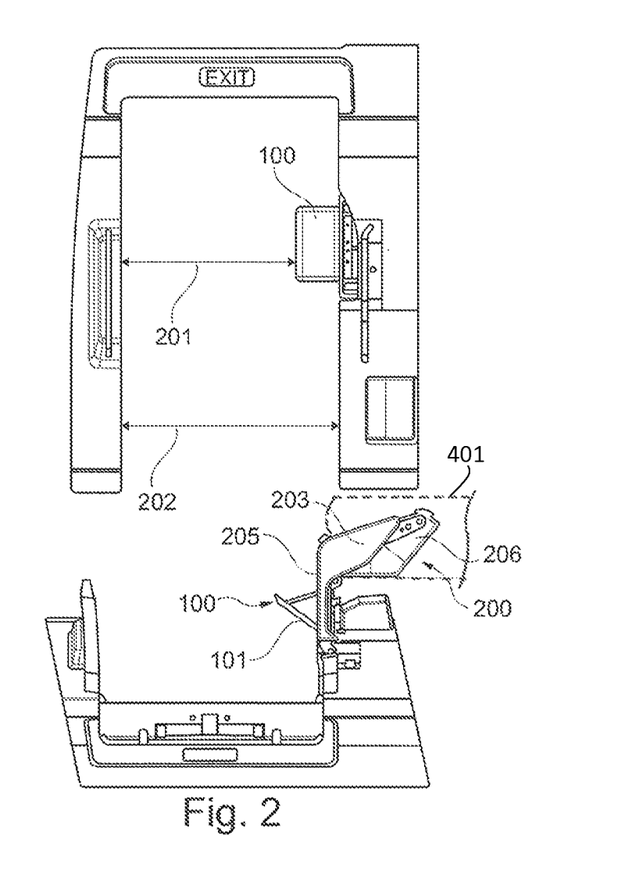
FIG. 2 shows the type "C" door region of an aircraft in the event of evacuation according to an embodiment of the present disclosure, when viewed from inside and from above.

FIG. 2 is a view of a door aperture of a transport means, with an open door, when viewed from inside the cabin of the transport means, and a view of this arrangement from above.

When the door is open, the movable carrier arm device 100 is folded out, and is thus in the extended position. This is necessary, for example, in the case of evacuation, when a type "C" exit must be provided. This may be the case, for example, when a single-track emergency slide is used, in order to prevent an excessive number of passengers from using the emergency slide at the same time.

In this instance, the effectively usable door aperture width is approximately 86 cm (about 34 inches) in the region of the carrier arm arrangement (see arrow 201). In the regions below and above (see arrow 202), the door aperture width corresponds to the width of a so-called type "A" exit.

As can be seen from the plan view of FIG. 2, the lateral surface 205 of the carrier arm cover 203 extends in the region of the carrier arm device 100 perpendicularly to the surface of the outer wall of the transport means so that, when the door is open, there is thereby no narrowing, or at least no substantial narrowing, of the door aperture width.

However, the covering flap 101 of the movable carrier arm device 100 has an angle of about 60 or about 70 degrees with respect to the surface 205 of the carrier arm cover so that it protrudes into the aperture.

The carrier arm cover 203 is constructed to partially cover the carrier arm 206 of the carrier arm arrangement 200 and can be replaced, if necessary. This may be advantageous, for example, in the case of converting from a single-track emergency slide to a dual-track emergency slide.

Figure 3:
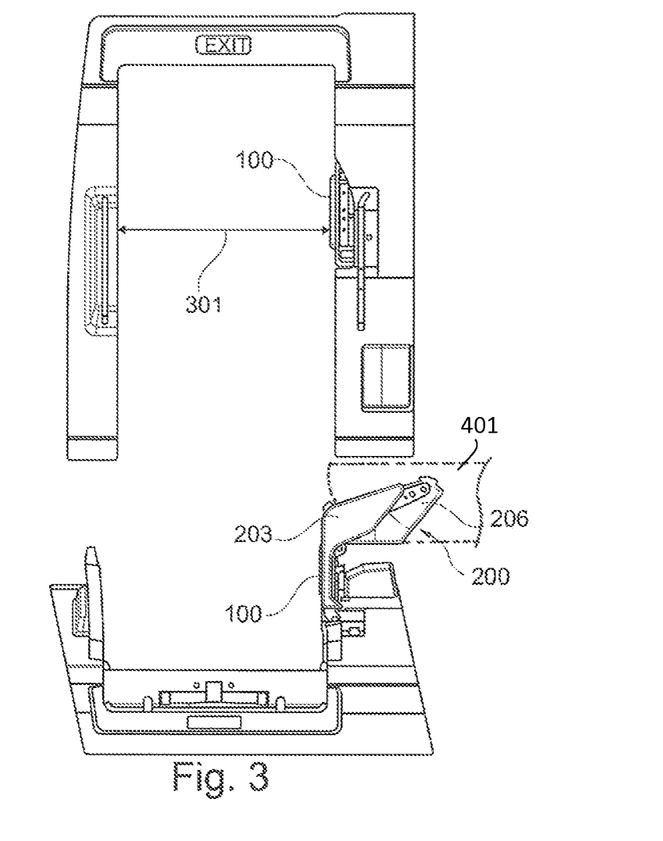
FIG. 3 shows the interior region of FIG. 2, with normal door opening.

FIG. 3 shows two illustrations of the arrangement of FIG. 2 with the movable carrier arm device 100 in a retracted position. The movable carrier arm device is located in the folded-in state. Consequently, substantially the entire door width is available for passengers to embark and disembark.

With the door open, the surface of the carrier arm device 100 protrudes only insignificantly, for example, by approximately 2.5 cm from the plane of the carrier arm cover 203 so that an effective door aperture width 301 of about 104 cm (about 41 inches) is produced at the height of the carrier arm arrangement.

Figure 4A:
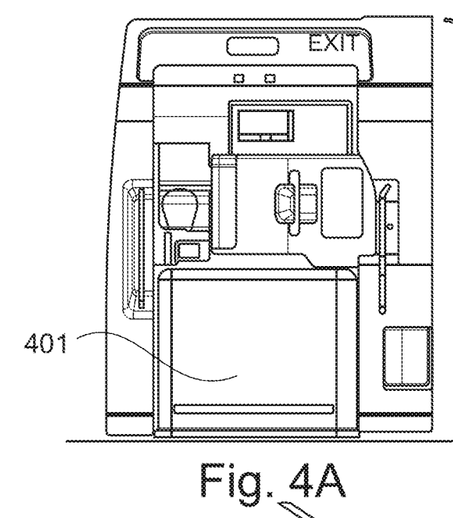
FIG. 4A shows the interior region of FIG. 2, with the door closed.
Figure 4B:
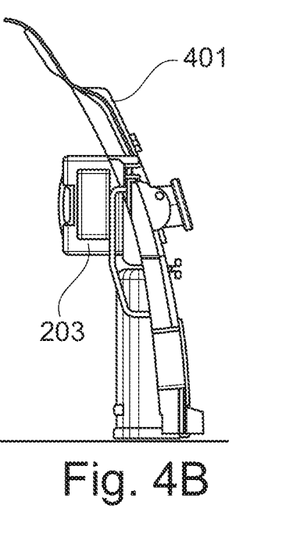
FIGS. 4B and 4C are two illustrations of the door of FIG. 4A.
Figure 4C:
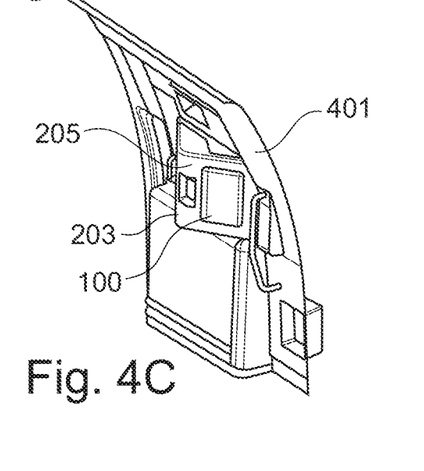

FIG. 4A shows the door region when viewed from inside the passenger cabin with the door 401 closed. For example, it can be seen that the carrier arm arrangement protrudes into the cabin by a relatively small extent.

With the customer option of a type "C" exit, the standard component carrier arm cover (so-called "hinge arm cover") can be slightly adapted, for example, by a recess being provided. In addition, the movable carrier arm device (also referred to as a "foldable hinge arm device") is mounted on the carrier arm of this door.

The basic position is the folded-in state (see FIG. 1A).

FIG. 5A shows a door frame structure 505 having a door 401 and a carrier arm arrangement which is fitted thereto.

FIG. 5B is a sectional illustration through the carrier arm arrangement of the door 401, which is shown in FIG. 5A. Either each time the door is opened or only when the emergency slide is actuated, for example, by means of a coupling with the actuation lever for arming the emergency slide (so-called slide arming lever), the covering flap 101, which is constructed in the form of a front element, is raised by means of a frame-side, optionally telescopic pressure pin 501. This operation can also be seen in FIG. 1B.

The pressure pin 501 is independently actuated by the door moving closer when it is pivoted open and during its associated movement in the direction of the door frame structure since it strikes the door frame structure 505 when the door pivots open (see FIG. 5B).

The pressure pin 501 lifts the covering flap of the carrier arm device so far that the self-closing dead centre position is exceeded and the flap is automatically further deployed into the opened end position (see FIG. 1C), for example, by means of clamping or torsional spring force.

Alternatively or in addition to the pressure pin 501, there may also be provided, for example, an actuation hook which releases the covering flap 101 by means of a rotational movement when the door is opened and optionally presses it over the dead centre position. There may also be provision for the covering flap 101 to be pretensioned from the start in such a manner that a release of the front element is sufficient to enable automatic opening.

In the extended position, the carrier arm device can absorb loads, for example, of about 2250 Newton, which may occur in the event of an emergency evacuation, and direct them into the structure.

The rotational movement of the covering flap 101 is indicated by the arrow 502 in FIG. 5B.

An advantage of the carrier arm arrangement is that, in the fully automated embodiment, the covering flap 101 springs open only in the very rare case of an emergency opening of the door and, in the semi-automated variant, there is the possibility of manually folding in again the flap 101 which is deployed after a "normal" door opening in order to expand the aperture region from about 34 inches, for example, to about 41 inches. In spite of a type "C" exit, almost the entire width of the type "A" door cutout can consequently be used.

For example, there may also be provision for the covering flap 101 of the carrier arm device to finish flush with the surface of the carrier arm cover 203 so that in this portion the entire width can be used by the passengers when the carrier arm arrangement is folded in.

Consequently, the provision of a constant structural cutout dimension for each door in the aircraft is possible, regardless of whether a single-track or a dual-track emergency slide is intended to be used, or whether a type "A" exit or a type "C" exit is provided.

The carrier arm arrangement 200 is, for example, used only with the customer-specific equipment option type "C" (single-track emergency slide).

There may be provision for the folding open of the carrier arm device 100 always to be carried out independently and not manually, either in a fully automated manner only with an armed emergency slide or in a semi-automated manner each time the door opens normally.

The folding-in occurs manually in the semi-automated variant. In the fully automated variant, folding-in of the covering flap 101 is not necessary since the flap 101 remains closed other than in the rare case of an evacuation.

The foldable carrier arm device can be produced with a slightly modified (cutout) standard cover for the type "A" exit.

As an "attachment solution", the foldable carrier arm device can be placed on the cover and can be screwed to the carrier arm.

Figure 6:
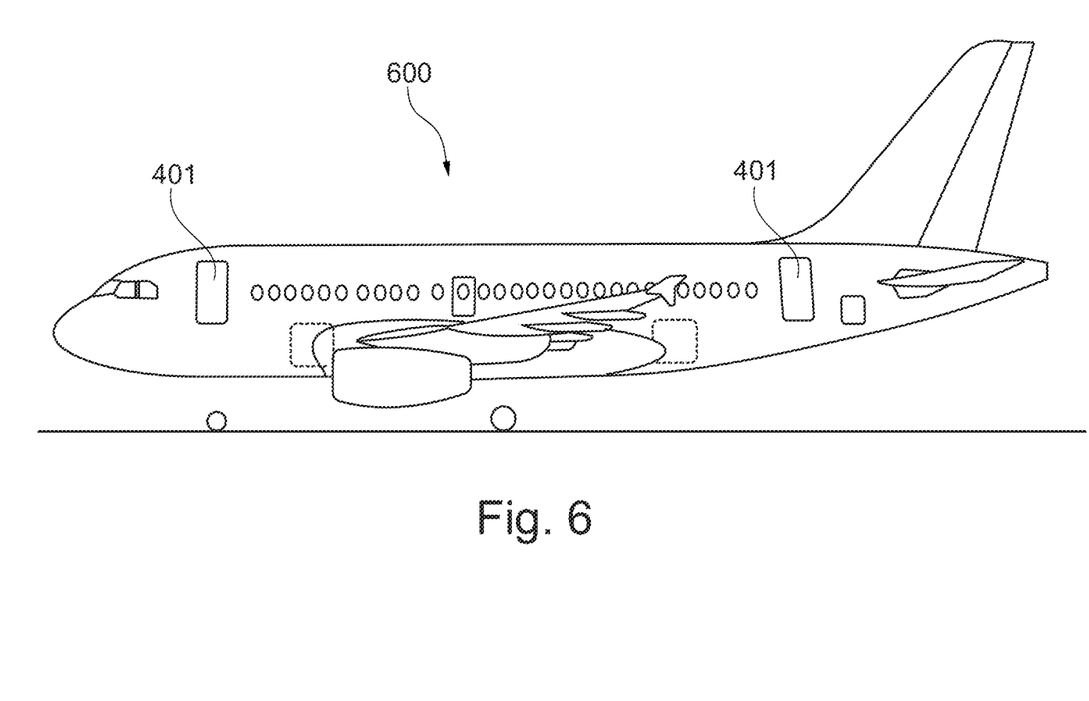
FIG. 6 shows an aircraft according to an embodiment of the present disclosure.

FIG. 6 shows an aircraft 600 according to an embodiment of the present disclosure which has a plurality of doors 401 with the above-described carrier arm arrangements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. Transport means comprising a carrier arm arrangement and a door of the transport means, the carrier arm arrangement comprising:
    a carrier arm connecting the door to a structure of the transport means and retaining and supporting the door;
    a movable carrier arm device comprising a covering flap which is adapted to assume a retracted position and an extended position; and
        a carrier arm cover for covering a region of the carrier arm,
    wherein the carrier arm cover has a recess for receiving a portion of the movable carrier arm device, and
    wherein the carrier arm arrangement is adapted to reduce a width of an aperture of the door by moving the covering flap of the movable carrier arm device from the retracted position to the extended position when the door is in an open position.

2. The carrier arm arrangement according to claim 1,
    wherein the carrier arm arrangement reduces the width of the door aperture to approximately 80% by the movable carrier arm device being extended.

3. The carrier arm arrangement according to claim 1,
    wherein the movable carrier arm device is secured to at least one of the carrier arm cover and carrier arm.

4. The carrier arm arrangement according to claim 1,
    wherein the movable carrier arm device, starting from the retracted position, automatically moves into the extended position when the door is opened.

5. The carrier arm arrangement according to claim 4,
    wherein the movable carrier arm device only automatically moves into the extended position when the door is opened in the event of an emergency, which emergency requires the use of an emergency slide.

6. The carrier arm arrangement according to claim 4,
    wherein the movable carrier arm device only automatically moves into the extended position when the door is opened in the event of an emergency, which emergency requires the use of a single-track emergency slide.

7. A door for a transport means comprising: a carrier arm arrangement comprising:
    a carrier arm connecting the door to a structure of the transport means and which retains and supports the door;
    a movable carrier arm device comprising a covering flap which is adapted to assume a retracted position and an extended position; and
    a carrier arm cover for covering a region of the carrier arm,
    wherein the carrier arm cover has a recess for receiving a portion of the movable carrier arm device, and
    wherein the carrier arm arrangement is adapted to reduce a width of an aperture of the door by moving the covering flap of the movable carrier arm device from the retracted position to the extended position, and wherein the movable carrier arm device, starting from the retracted position, automatically moves into the extended position when the door is opened.

8. The door according to claim 7, wherein the door is a door on an aircraft.

9. The door according to claim 7,
    wherein the movable carrier arm device only automatically moves into the extended position when the door is opened in the event of an emergency, which emergency requires the use of an emergency slide.

10. The door according to claim 7,
    wherein the movable carrier arm device only automatically moves into the extended position when the door is opened in the event of an emergency, which emergency requires the use of a single-track emergency slide.

11. The door according to claim 7,
    wherein the movable carrier arm device is secured to at least one of the carrier arm cover and carrier arm.

12. An aircraft comprising: a cabin having a door; a carrier arm arrangement coupled to the door that includes: a carrier arm connecting the door to a structure of the aircraft and which retains and supports the door; a movable carrier arm device comprising a covering flap which is adapted to assume a retracted position and an extended position, a carrier arm cover for covering a region of the carrier arm, wherein the carrier arm cover has a recess for receiving a portion of the movable carrier arm device, and wherein the carrier arm arrangement is adapted to reduce a width of an aperture of the door by moving the covering flap of the movable carrier arm device from the retracted position to the extended position when the door is in an open position.

13. The aircraft to claim 12,
    wherein the movable carrier arm device, starting from the retracted position, automatically moves into the extended position when the door is opened.

14. The aircraft according to claim 13,
    wherein the movable carrier arm device only automatically moves into the extended position when the door is opened in the event of an emergency, which emergency requires the use of an emergency slide.

15. The aircraft according to claim 13,
wherein the movable carrier arm device only automatically moves into the extended position when the door is opened in the event of an emergency, which emergency requires the use of a single-track emergency slide.

16. The aircraft according to claim 12,
wherein the carrier arm arrangement reduces the width of the door aperture to approximately 80% by the movable carrier arm device being extended.

\* \* \* \* \*